US012705804B2

(12) United States Patent
Morris et al.

(10) Patent No.: US 12,705,804 B2
(45) Date of Patent: Aug. 11, 2026

(54) AUGMENTED REALITY BASED AIMING OF LIGHT FIXTURES

(71) Applicant: SIGNIFY HOLDING B.V., Eindhoven (NL)

(72) Inventors: Tyler Brian Morris, Liverpool, NY (US); Walten Peter Owens, Manlius, NY (US); Nam Chin Cho, Peachtree City, GA (US); George Albert Dederich, Syracuse, NY (US)

(73) Assignee: SIGNIFY HOLDING B.V., Eindhoven (NL)

( * ) Notice: Subject to any disclaimer, the term of this patent is extended or adjusted under 35 U.S.C. 154(b) by 181 days.

(21) Appl. No.: 18/693,286

(22) PCT Filed: Sep. 13, 2022

(86) PCT No.: PCT/EP2022/075348
§ 371 (c)(1),
(2) Date: Mar. 19, 2024

(87) PCT Pub. No.: WO2023/046524
PCT Pub. Date: Mar. 30, 2023

(65) Prior Publication Data

US 2024/0386625 A1 Nov. 21, 2024

Related U.S. Application Data

(60) Provisional application No. 63/246,343, filed on Sep. 21, 2021.

(30) Foreign Application Priority Data

Oct. 14, 2021 (EP) .................................... 21202593

(51) Int. Cl.
*G09G 5/00* (2006.01)
*F21V 23/00* (2015.01)
(Continued)

(52) U.S. Cl.
CPC ............ *G06T 11/00* (2013.01); *F21V 23/003* (2013.01); *H04N 23/63* (2023.01); *F21V 14/00* (2013.01)

(58) Field of Classification Search
CPC ......... G06T 19/006; G06T 19/00; G06T 7/74; G06T 7/94; G06T 11/00;
(Continued)

(56) References Cited

U.S. PATENT DOCUMENTS

2013/0268246 A1 10/2013 Gordin
2014/0343699 A1* 11/2014 Engelen .............. G06F 3/04847 700/90
(Continued)

FOREIGN PATENT DOCUMENTS

EP 3592119 A1 1/2020
WO 2017194351 A1 11/2017

OTHER PUBLICATIONS

Speer, Dave, "Aiming Floodlights in Direct Mode," Jun. 21, 2018, Lighting Analysts, Illumination Engineering Software From Revalize, URL: https://lightinganalysts.com/aiming-floodlights/, Last Retrieved on Mar. 19, 2024 (6 Pages).

*Primary Examiner* — Gordon G Liu

(57) ABSTRACT

An augmented reality (AR) device includes a camera unit, a display unit, and an AR unit. The AR unit is configured to obtain a rendered image of an area. The rendered image includes a virtual marker indicating a virtual target location in the rendered image, the virtual target location corresponding to a physical target location in the area for aiming a light fixture. The AR unit is also configured to display on the display unit a real-time image of the area as seen by the camera unit, where a reticle of the camera unit is displayed over the real-time image. The AR unit is further configured to display the rendered image overlayed on and anchored to the real-time image, where the AR device is positionally
(Continued)

adjustable together with the light fixture such that the reticle overlaps the virtual marker to aim the light fixture at the physical target location.

14 Claims, 17 Drawing Sheets

(51) Int. Cl.
*G06T 11/00* (2006.01)
*H04N 23/63* (2023.01)
*F21V 14/00* (2018.01)

(58) Field of Classification Search
CPC . G06T 2207/10012; G06T 2207/20021; G06T 7/50; G06T 7/246; G06T 11/60; G06T 2207/20081; G06T 2207/20084; G06T 11/001; G06T 15/205; G06F 3/011; G06F 3/012; G06F 3/04815; G02B 27/017; G02B 1/041; G02B 2027/0178; G02B 5/18; G02B 27/4205; G02B 27/0172; G02B 27/0101; H04L 67/52; H04N 7/152; H04N 5/265; H04N 23/90; H04N 23/63; G06V 20/20; G06V 10/44; G06V 10/82; G06V 10/764; G06V 40/161; G06Q 10/087; F21V 23/003; F21V 14/00; F21V 23/0435; F21V 21/15; G96V 10/24; H05B 47/105
USPC .......................................................... 345/633
See application file for complete search history.

(56) References Cited

U.S. PATENT DOCUMENTS

| | | | | |
|---|---|---|---|---|
| 2017/0205061 | A1 | 7/2017 | Broers et al. | |
| 2018/0063924 | A1 | 3/2018 | Alfier et al. | |
| 2020/0187333 | A1 | 6/2020 | Sanders et al. | |
| 2020/0257831 | A1 | 8/2020 | Boudreau et al. | |
| 2020/0265647 | A1* | 8/2020 | Cho | G06T 15/50 |
| 2023/0063944 | A1* | 3/2023 | Tham | G06V 40/20 |

* cited by examiner

AUGMENTED REALITY BASED AIMING OF LIGHT FIXTURES

CROSS-REFERENCE TO PRIOR APPLICATIONS

This application is the U.S. National Phase application under 35 U.S.C. § 371 of International Application No. PCT/EP2022/075348, filed on Sep. 13, 2022, which claims the benefit of U.S. Provisional Patent Application No. 63/246,343, filed on Sep. 21, 2021 and European Patent Application Ser. No. 21202,593.6, filed on Oct. 14, 2021. These applications are hereby incorporated by reference herein.

TECHNICAL FIELD

The present disclosure relates generally to lighting fixtures, and more particularly to aiming light fixtures at desired locations.

BACKGROUND

Some areas may have a large number of luminaires that provide illumination lights. For example, a sport arena and other similar venues may have a large number of luminaires to illuminate a field, a court, etc. The precise aiming of individual luminaires may be important to achieve desired lighting of such areas. For example, the need for precision of luminaire aiming may be, for example, to cut off light before reaching spectators, to limit the amount of light that spills into adjacent communities or the sky, and/or due to photometrical requirements of television broadcasting of a game played in an area. A typical method of precisely aiming luminaires at target locations in an area involves physically marking the target locations in the area (e.g., a football field) and pointing a laser from the location of a luminaire to a respective marked location. However, in addition to other challenges, such a method can be excessively time consuming and generally requires multiple people. Thus, a solution that enables efficient luminaire aiming may be desirable.

SUMMARY

The present disclosure relates generally to lighting fixtures, and more particularly to aiming light fixtures at desired locations. In an example embodiment, an augmented reality (AR) device includes a camera unit, a display unit, and an AR unit. The AR unit is configured to obtain a rendered image of an area. The rendered image includes a virtual marker indicating a virtual target location in the rendered image, the virtual target location corresponding to a physical target location in the area for aiming a light fixture. The AR unit is also configured to display on the display unit a real-time image of the area as seen by the camera unit, where a reticle of the camera unit is displayed over the real-time image. The AR unit is further configured to display the rendered image overlayed on and anchored to the real-time image, where the AR device is positionally adjustable together with the light fixture such that the reticle overlaps the virtual marker to aim the light fixture at the physical target location.

In another example embodiment, a method of light fixture aiming includes obtaining, by an augmented reality (AR) unit, a rendered image of an area. The rendered image includes a virtual marker indicating a virtual target location in the rendered image, where the virtual target location corresponds to a physical target location in the area for aiming a light fixture. The method further includes displaying on a display unit, by the AR unit, a real-time image of the area as seen by a camera unit, where a reticle of the camera unit is displayed on the display unit. The method also includes displaying on the display unit, by the AR unit, the rendered image of the area overlayed on and anchored to the real-time image of the area. Aiming the light fixture at the physical target location includes positionally adjusting the light fixture and the camera unit together such that the reticle of the camera unit overlaps the virtual marker.

These and other aspects, objects, features, and embodiments will be apparent from the following description and the appended claims.

BRIEF DESCRIPTION OF THE FIGURES

Reference will now be made to the accompanying drawings, where.

Figure 1:
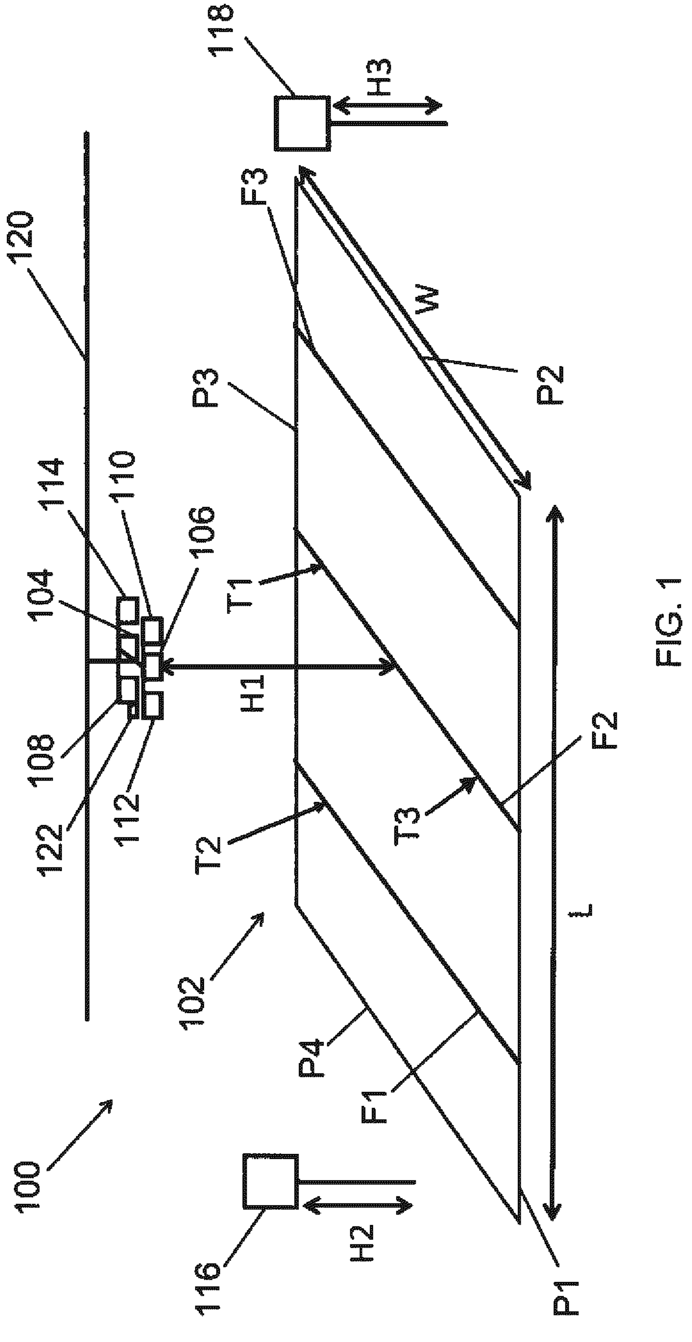
FIG. 1 illustrates a space including light fixtures that illuminate an area according to an example embodiment.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, the same reference numerals that are used in different drawings designate like or corresponding but not necessarily identical elements.

DETAILED DESCRIPTION OF EXAMPLE EMBODIMENTS

In the following paragraphs, particular embodiments will be described in further detail by way of example with reference to the figures. In the description, well known components, methods, and/or processing techniques are omitted or briefly described. Furthermore, reference to various feature(s) of the embodiments is not to suggest that all embodiments must include the referenced feature(s).

In some example embodiments, systems, devices, and methods that are based on augmented reality (AR) may be used to aim light fixtures in venues such as sports venues. For example, light fixture aiming target locations and corresponding light fixture orientations may be determined during a lighting design process. An area of a venue that is intended to be illuminated by light fixtures may be modeled. For example, a computing device can generate a model (e.g., an image) of the area, where the model shows locations for aiming the light fixtures. After attaching an AR device to an individual light fixture, the generated model, the real-time image from a camera unit, and the reticle of the camera unit may be used to aim the light fixture at the respective aiming target location in the area the locations shown in the model. In some alternative embodiments, a model may be generated with respect to each light fixture and based on the expected view of the camera unit from the location of the light fixture and at an orientation of the camera unit corresponding to the light fixture being aimed at an aiming target location. In such alternative embodiment, the model may be anchored to a display screen, where light fixture and the camera unit are moved along with each other such that the real-time image is fully overlayed on the displayed model.

Turning now to the figures, particular example embodiments are described. FIG. 1 illustrates a space 100 including light fixtures 104-118 that illuminate an area 102 according to an example embodiment. For example, the space 100 may be a sports arena or another type of venue. The area 102 may be a stage, a field, a court (e.g., tennis court), etc. For example, the area 102 may have features such as boundary perimeters P1, P2, P3, P4. The area 102 may also have other features such as inner lines F1, F2, F3. In some example embodiments, the light fixtures 104-114 may be installed suspended from a roof or ceiling structure 120, and the light fixtures 116, 118 may be attached to poles. The light fixtures 104-114 may be installed at a height H1, and the light fixtures 116 and 118 may be at heights H2 and H3, respectively.

In some example embodiments, following installation or at a later time, the light fixtures 104-118 may be aimed at desired physical target locations in the area 102. As explained below in more detail, an augmented reality (AR) device 122 may be used to aim the light fixtures 104-118 individually at the respective desired physical target locations. For example, the AR device 122 may be a portable device such as a smartphone, a tablet, a camera, etc. The AR device 122 may be temporarily attached to one of the light fixtures 104-118 for use in aiming the particular light fixture such that the AR device 122 moves (e.g., tilt and pan) along with the particular light fixture. For example, the AR device 122 may be attached to the light fixture 108 for use in aiming the light fixture 108 at a desired physical target location (e.g., the location T2). To aim another light fixture (e.g., the light fixture 104) at a desired physical target location (e.g., the location T1) before or after aiming the light fixture 108, the AR device 122 gets attached to the other light fixture instead of the light fixture 108. Details of how the AR device 122 is used in aiming the light fixtures 104-118 are described below.

In some example embodiments, before aiming the light fixtures 114-118, a lighting designer may perform a lighting design to determine a desired physical target location in the area 102 for each light fixture 104-118. To illustrate, a lighting design software (e.g., AGI32) may be used to determine a physical target location for each light fixture 104-118. For example, a lighting designer may determine that the light fixture 104 should be aimed at a physical target location T1 in the area 102, that the light fixture 108 should be aimed at a physical target location T2 in the area 102, and that the light fixture 106 should be aimed at a physical target location T3 in the area 102. As another example, the lighting designer may determine that the light fixture 104 should be aimed at the physical target location T1 for some events and that the light fixture 104 should be aimed at the physical target location T2 for other events.

In some example embodiments, information such as dimensions of the area 102 (e.g., length L and width W), locations of features of the area 102 (e.g., boundary perimeters P1, P2, P3, P4 and lines F1, F2, F3), locations of the light fixtures 104-118, and the photometric properties of the light fixtures 104-118 may be used to determine the physical target locations for the light fixtures 104-118. A location in the space 100 may serve as a reference location, such as an origin of x, y, z coordinates, and the locations of the features of the area 102, locations of the light fixtures 104-118, etc. may be expressed relative to the reference location as can be readily understood by those of ordinary skill in the art with the benefit of the scope of this disclosure. For example, the reference location may be a location in the area 102, and the distance of the light fixture 104 from the reference location may be expressed with respect to the x-, y-, z-axis, where the height H1 is represented on the z-axis. The physical target locations, such as the physical target locations T1 and T2, may also be identified relative to the reference location.

Figure 2:
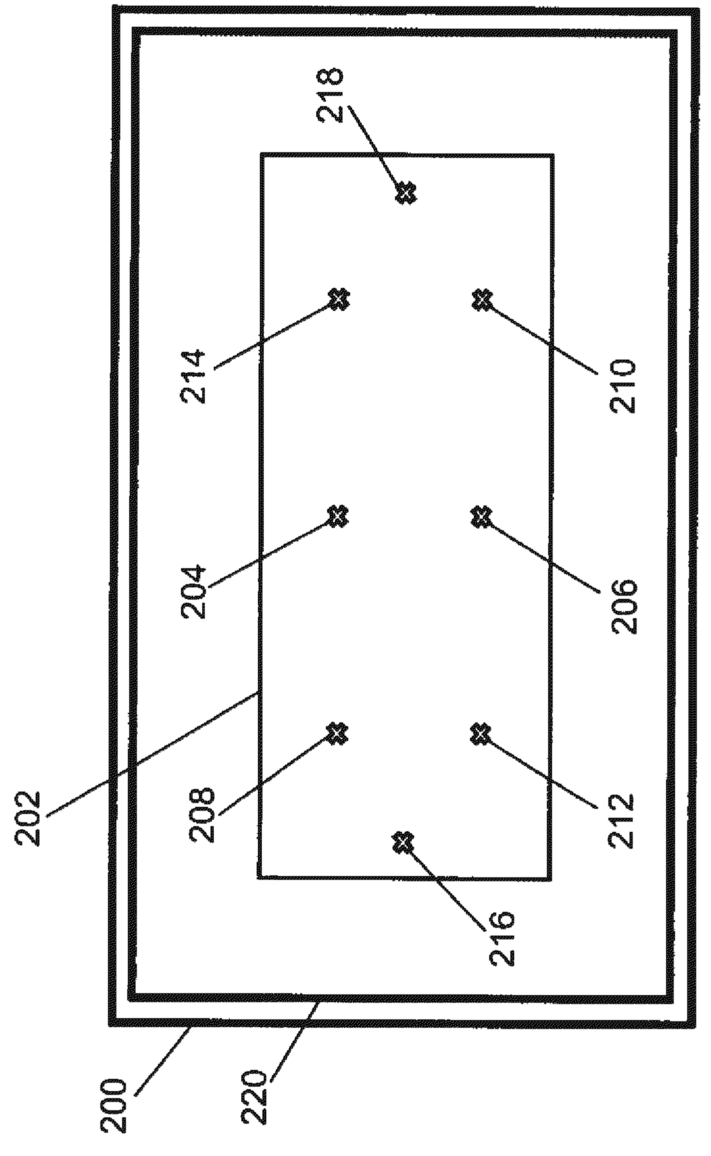
FIG. 2 illustrates a rendered image of the area of FIG. 1 including virtual markers that indicate virtual target locations according to an example embodiment.

FIG. 2 shows a rendered image 202 of the area 102 of FIG. 1 including virtual markers 204-218 that indicate virtual target locations displayed on a display screen 220 of a display unit 200 according to an example embodiment. The display unit 200 may be a display unit of the AR device or an AR system. Alternatively, the rendered image 202 may be displayed on another display unit of another device, such as a computing device that is used to generate the rendered image 202 without departing from the scope of this disclosure.

In some example embodiments, a lighting design software and/or another software (e.g., a CAD software) may be used to generate the rendered image 202. To illustrate, the rendered image 202 may be generated based on information such as the dimensions of the area 102 and the features of the area 102 such as the boundary perimeters P1, P2, P3, P4 and lines F1, F2, F3. The virtual markers 204-218 in the rendered image 202 may indicate virtual target locations in the rendered image 202 that corresponds to physical target locations in the area 102 for aiming the light fixtures 104-118.

To illustrate, the virtual marker 204 may correspond to a physical target location (e.g., a physical target location T1) in the area 102 for aiming the light fixture 104. That is, the virtual marker 204 may indicate a virtual target location in the rendered image 202 corresponding to a physical target location (e.g., a physical target location T1) in the area 102 for aiming the light fixture 104. For example, a particular physical target location (e.g., the location T1) may be determined as the location for aiming the light fixture 104 through the lighting design process. The virtual marker 206 may correspond to another physical target location (e.g., location T3) in the area 102 for aiming the light fixture 106. The virtual marker 208 may correspond to another physical target location (e.g., location T2) in the area 102 for aiming the light fixture 108. The virtual marker 210 may correspond to another physical target location in the area 102 for aiming the light fixture 110. The virtual marker 212 may correspond to another physical target location in the area 102 for aiming the light fixture 112. The virtual marker 214 may correspond to another physical target location in the area 102 for aiming the light fixture 114. The virtual marker 216 may correspond to another physical target location in the area 102 for aiming the light fixture 116. The virtual marker 218 may correspond to another physical target location in the area 102 for aiming the light fixture 118. As described below in more detail, the AR device 122 may be used to aim the individual light fixtures 104-118 at a respective physical target location based on the rendered image 202 by aiming a camera unit of the AR device 122 such that a reticle of the camera unit overlaps a virtual marker that corresponds to the respective physical target location.

By using the AR device 122 (or a corresponding AR system), the aiming of light fixtures at desired physical target locations in the area 102 or other areas can be performed relatively quickly. Compared to traditional methods of light fixture aiming, the use of the AR device 122 or a corresponding AR system can reduce the number of people required to perform light fixture aiming particularly in relatively large spaces such as stadiums, etc.

In some alternative embodiments, the rendered image 202 may include more or fewer virtual markers than shown without departing from the scope of this disclosure. In some alternative embodiments, a camera unit may be used instead of the AR device 122, where the camera unit is a part of an AR system without departing from the scope of this disclosure. In some alternative embodiments, the AR device 122 can be placed or held close to an individual light fixture instead of being attached to the particular light fixture.

In some example embodiments, the space 100 may be an open or closed arena. In some alternative embodiments, the space 100 may include more or fewer light fixtures than shown without departing from the scope of this disclosure. In some alternative embodiments, some or all of the light fixtures may be installed at different locations than shown without departing from the scope of this disclosure. For example, some or all of the light fixtures 104-114 may not be suspended and may instead be mounted on poles at the same or different heights from each other. In some alternative embodiments, some of the light fixtures 104-118 may include a group of light fixtures that are aimed individually at respective target locations. In some alternative embodiments, the area 102 may have a different shape, different dimensions, etc. without departing from the scope of this disclosure. In some alternative embodiments, the area 102 may include more or fewer features (e.g., boundary perimeters, lines, etc.) than shown without departing from the scope of this disclosure. In some alternative embodiments, the space 100 may have different and/or other structures than shown without departing from the scope of this disclosure.

Figures 3, 4:
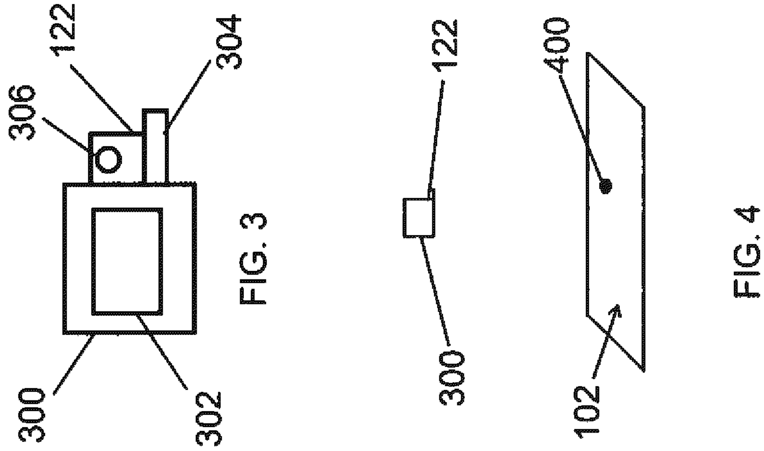
FIG. 3 illustrates a light fixture and the augmented reality (AR) device of FIG. 1 for aiming the light fixture according to an example embodiment.
FIG. 4 illustrates the light fixture of FIG. 3 along with the AR device oriented toward the area according to an example embodiment.

FIG. 3 illustrates a light fixture 300 and the augmented reality (AR) device 122 for aiming the light fixture 300 according to an example embodiment, and FIG. 4 illustrates the light fixture 300 of FIG. 3 along with the AR device 122 oriented toward the area 102 according to an example embodiment. FIG. 3 may be a bottom view or a side view of the light fixture 300 depending on the installation of the light fixture 300. Referring to FIGS. 1-4, in some example embodiments, the light fixture 300 may correspond to the individual light fixtures 104-118 shown in FIG. 1. For example, the light fixture 300 may include a light source 302 that emits a light to illuminate the area 102. The light fixture 300 may be installed such that the position of the light fixture 300 is adjustable during or after installation. For example, tilt and pan positions of the light fixture 300 may be adjustable as can be readily understood by those of ordinary skill in the art.

In some example embodiments, the AR device 122 may be positioned for use in aiming the light fixture 300 at a desired physical target location such as a location 400 in the area 102. To illustrate, the AR device 122 may be positioned such that the light fixture 300 and a camera unit 306 (e.g., a lens of the camera unit 306) of the AR device 122 point toward the same direction and/or the same general location. For example, the AR device 122 may be attached to the light fixture 300 using a mounting structure 304 or another means. The AR device 122 may be attached to the light fixture 300 such that the AR device 122 moves (e.g., tilts and pans) along with the light fixture 300. The AR device 122 may be attached to the light fixture 300 such that the tilt and pan positions of the light fixture 300 match or can be derived from the tilt and pan positions of the AR device 122.

In some example embodiments, the AR device 122 may be attached to the light fixture 300 temporarily to allow the AR device 122 to be used for aiming other light fixtures. For example, the AR device 122 (or a component of the AR device 122, such as the camera unit 306) may be a portable device such as a smartphone, a tablet, a camera, etc. Alternatively, the camera unit 306 may be used instead of the AR device 122, where the camera unit is a part of an AR system without departing from the scope of this disclosure. For example, instead of the AR device 122, the camera unit 306 may be attached to the light fixture 300 as a standalone unit that communicates with other components of an AR system.

In some alternative embodiments, the light fixture 300, the light source 302, the mounting structure 304, the AR device 122, and/or the camera unit 306 may have a different shape or may be at different locations than shown without departing from the scope of this disclosure. In some alternative embodiments, the AR device 122 may be integrated in the light fixture 300 without departing from the scope of this disclosure. In some alternative embodiments, the AR device 122 may be at a different location than shown relative to the light fixture 300 without departing from the scope of this disclosure. For example, the AR device 122 may be positioned within a housing of the light fixture 300. The AR device 122 may be directly attached to the light fixture 300. For example, the mounting structure 304 may be omitted or may be integral with the light fixture 300. In some alternative embodiments, the AR device 122 may be positioned close to the light fixture 300 without being attached to the light fixture 300 without departing from the scope of this disclosure.

Figure 5:
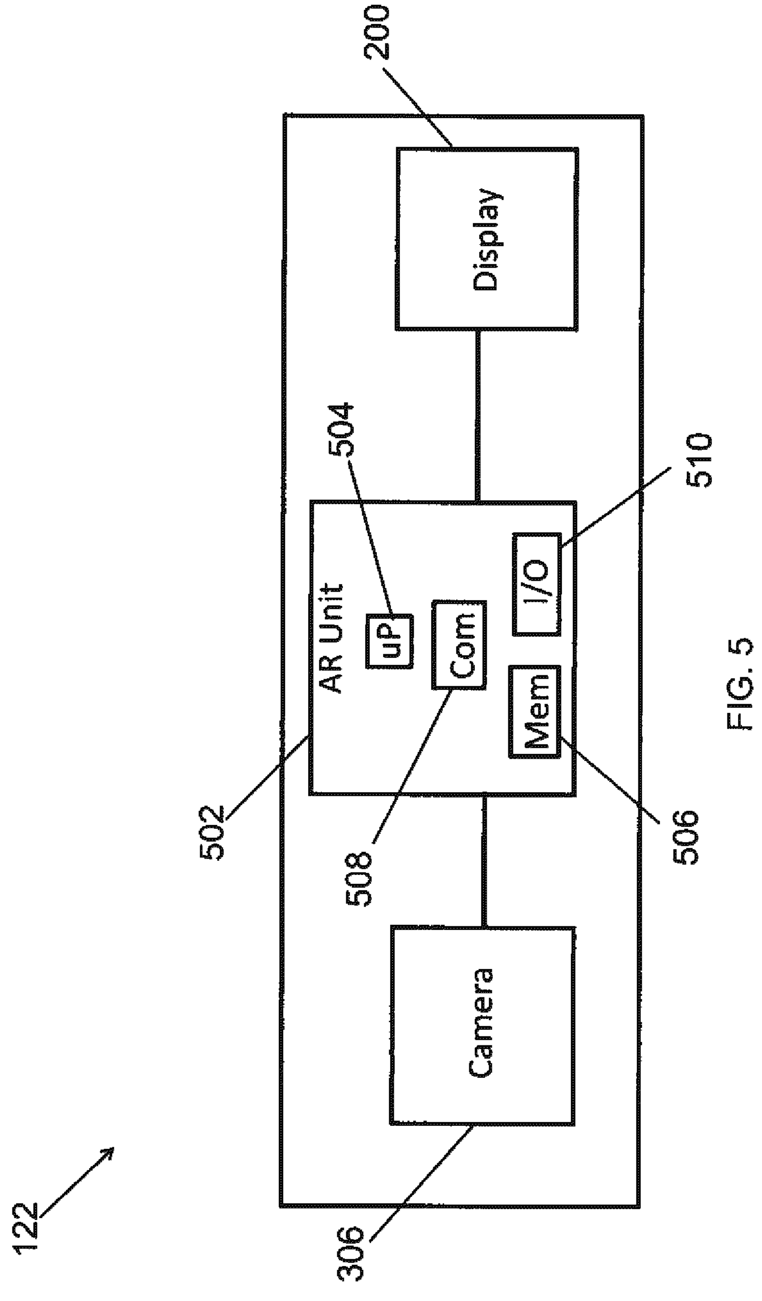
FIG. 5 illustrates a block diagram of the AR device of FIGS. 1, 3, and 4 according to another example embodiment.

FIG. 5 illustrates a block diagram of the AR device 122 of FIGS. 1, 3, and 4 according to another example embodiment. Referring to FIGS. 1-5, in some example embodiments, the AR device 122 may include an AR unit 502, the display unit 200, and the camera unit 306. The AR unit 502 may communicate with and control at least some of the operations of the display unit 200 and the camera unit 306. In general, the AR unit 502 may control the overall operation of the AR device 122.

In some example embodiments, the AR unit 502 may include a processor 504 (e.g., a microprocessor) that executes software code to perform the operations of the AR unit 502. The AR unit 502 may also include a memory device 506 (e.g., one or more flash memory units) that may be used to store the executable software code as well as data. For example, the executable software code may incorporate or interface with an AR software, such as ARKit, ARCore, HoloToolkit, etc. As another example, an AR software application (e.g., an AR application from Unity Technologies) that may be based on or that may incorporate one or more AR software, such as modules of ARKit, ARCore, Holokit, etc., may be stored in the memory device 506 and may be executed by the processor 504. Other executable software that may be used to process information, to control operations of different components of the AR device 122, etc. may be stored in the memory device 506.

In some example embodiments, the AR unit 502 may also include a communication interface module 508 that may be used for communicating wirelessly or via one or more wired connections with other devices. The AR unit 502 may also include an input/output interface 510 that may be used to receive input (e.g., a user input) and provide output (e.g., visual and/or audio) to a user.

In some example embodiments, the AR unit 502 may control the display unit 200 to display the rendered image 202 of the area 102 on the screen 220 of the display unit 200. The AR unit 502 may also control the display unit 200 to display a real-time image as viewed by the camera unit 306. For example, the AR device 122 may be attached to one of the light fixtures 104-118 at a time as described above with respect to the light fixture 300.

In some example embodiments, the AR unit 502 may display the rendered image 202 overlayed on the real-time image. To illustrate, the AR unit 502 may execute code to identify one or more matching features (e.g., boundary perimeters, etc.) between the real-time image and the rendered image 202 to overlay the rendered image 202 on the real-time image such that the two images are fully overlapped. Alternatively or in addition, the AR unit 502 may receive user input (e.g., using a mouse or a finger) that manually moves the rendered image 202 displayed on the display unit 200 such that the rendered image 202 is overlayed on the real-time image displayed on the display unit 200.

In some example embodiments, the AR unit 502 may control the display unit 200 to display the rendered image 202 anchored to the real-time image. For example, after the rendered image 202 is fully overlayed on the real-time image, the display unit 200 may display the rendered image 202, where the rendered image 202 remains overlayed on the real-time image even as the view of the camera unit 306 changes or a portion of the area 102 is blocked from view.

In some example embodiments, the reticle or another visual reference of the camera unit 306 may be used to aim a particular light fixture (e.g., the light fixture 104) to which the AR device 122 is attached. For example, the reticle may be physically present on the lens of the camera unit 306 or may be digitally generated. To illustrate, the reticle of the camera unit 306 may be displayed on the display unit 200, and the positions of the virtual markers 204-218 and other elements of the rendered image 202 relative to the reticle may change as the position of the camera unit 306 changes. The particular light fixture (e.g., the light fixture 104) to which the AR device 122 is attached may be aimed at the desired physical target location (e.g., location T1) in the area 102 by moving the light fixture (e.g., changing tilt and pan positions) along with AR device 122 such that the reticle of the camera unit 306 overlaps the virtual marker (e.g., the virtual marker 204) corresponding to the desired physical target location.

In some alternative embodiments, the reticle of the camera unit 306 may not be used to aim the light fixture 104-118. Instead, the aiming of the light fixtures 104-118 may be performed based on expected rendered images generated with respect to each light fixture. To illustrate, an expected rendered image with respect to each light fixture may be generated based on the view of the area 102 that the camera unit 306 is expected to have from the location of the particular light fixture when the camera unit 306 is aimed at a respective desired physical target location in the area 102 of the particular light fixture. As explained above, the desired physical target location in the area 102 with respect to each light fixture 104-118 may be determined through a lighting design process (e.g., using AGI32 software that may be executed by a computing device such as the AR device 122 or another device). The orientation (e.g., tilt and pan positions) of each light fixture 104-118 that corresponds to the particular light fixture being aimed at the respective desired physical target location may also be determined through the lighting design process.

Figure 14:
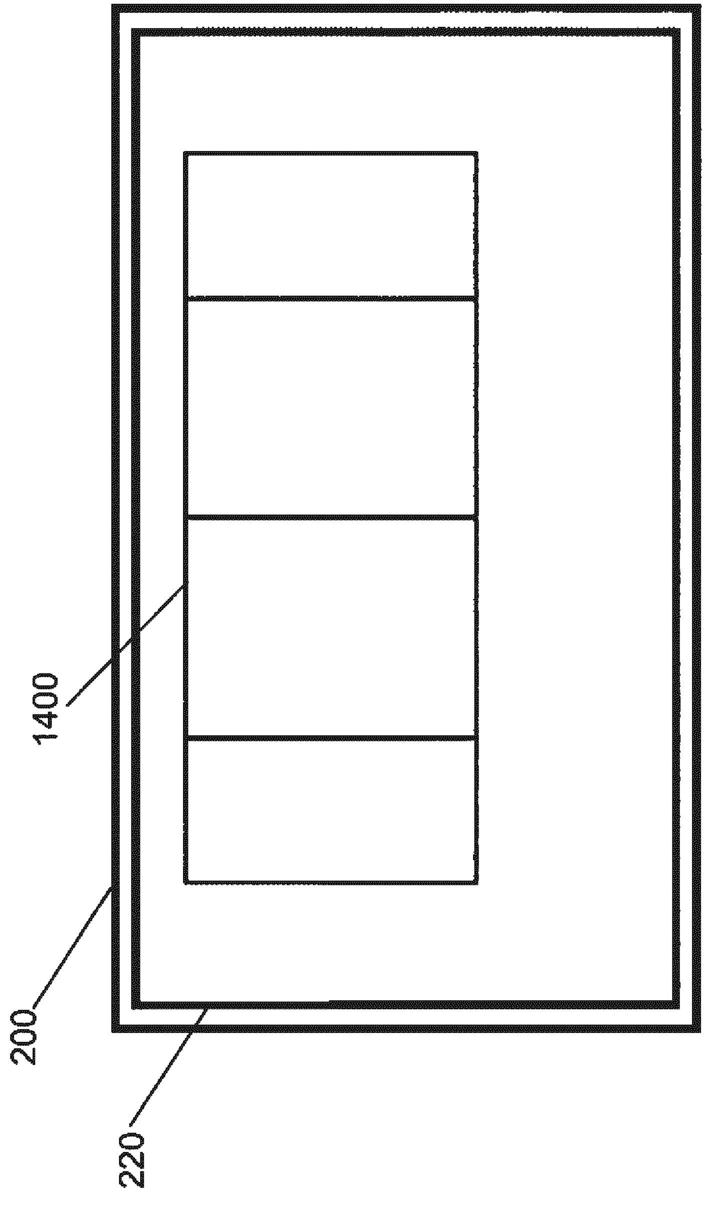
FIG. 14 illustrates a rendered image of the area of FIG. 1 based on an expected view of the camera unit 306 according to another example embodiment.

To illustrate with respect to the light fixture 104, in such alternative embodiments, a rendered image 1400 (shown in FIG. 14) may have been generated with respect to the light fixture 104 based on the expected view of the area 102 that the camera unit 306 may have from the known installation location of the light fixture 104 and when the camera unit 306 is aimed, for example, at the physical target location T1 (shown in FIG. 1). As described above, the installation location may be expressed, for example, in x, y, z coordinates with respect to a reference location in the space 100.

Referring to FIGS. 1, 3-5, and 14, the rendered image 1400 may include features corresponding to some or all visible features in the area 102, such as the boundary perimeters P1, P2, P3, P4, and/or the lines F1, F2, F3, from the expected perspective of the camera unit 306 when placed at the installation location of the light fixture 104 and when the camera unit 306 is aimed at the physical target location T1. In general, the rendered image 1400 may be different from the rendered images that may be generated with respect to the other light fixtures 106-118 based on respective expected views of the camera unit 306 from the installation locations of the light fixtures 106-118.

In such alternative embodiments, during a process of aiming a particular light fixture, the AR unit 502 may control the display unit 200 to display the rendered image anchored to (i.e., at a particular location on) the display screen 220. To illustrate with respect to the light fixture 104, once the rendered image 1400 is anchored to the display screen 220, the position of the rendered image 1400 on the display screen 220 may remain unchanged during the process of aiming the light fixture 104 at the physical target location T1. The anchoring position of the rendered image 1440 on the display screen 220 may depend on the view that the camera unit 306 is expected to have from the location of the light fixture 104 and when oriented such that the camera unit 306 is aimed at the physical target location T1. For example, the AR device 122 may include components such as a gyroscope, magnetometer, etc. that enable the AR device 122 to identify the anchoring position on the screen 220. The AR device 122 may process information such as the physical target location T1 (e.g., given in Cartesian coordinates with respect to a reference location), the location of the light fixture 104, etc. to determine the location on the screen 220 at which the rendered image 1400 should be anchored.

In such alternative embodiments, during the process of aiming a particular light fixture, after the AR device 122 is attached to the light fixture, the light fixture along with the AR device 122 may be moved (e.g., tilt and/or pan positions changed) such that the position of a real-time image of the area 102 displayed on the screen 220 changes while the displayed rendered image stays anchored at the same location of the screen 220. To aim the light fixture at the desired physical target location in the area 102, the light fixture along with the AR device 122 may be moved to make the real-time image and the anchored rendered image fully overlap each other on the screen 220. For example, the real-time image may be overlayed on the rendered image or vice versa. Because the rendered image is generated based on the view that the camera unit 306 is expected to have from the location of the particular light fixture and when aimed at the respective physical target location, adjusting the position of the light fixture along with AR device 122 may result in the light fixture being aimed at the desired physical target location.

In some example embodiments, after a particular light fixture to which the AR device 122 is attached is aimed at a desired physical target location using the AR device 122, the orientation (e.g., tilt and pan positions) of the AR device 122 may be determined by the AR device 122. For example, the AR device 122 may include components that enable determining the location and/or the orientation of the AR device 122 (thus, that of the camera unit 306). As describe above, the AR device 122 may include components such as an accelerometer, a magnetometer, a gyroscope, and/or other devices that enable determining the location and/or the orientation of the AR device 122.

In some example embodiments, because the orientation of the AR device 122 is expected to be the same or to closely match the orientation of the light fixture to which the AR device 122 is attached, the orientation of the AR device 122 after the aiming of the light fixture may be compared against the orientation that the light fixture is expected to have when the light fixture is aimed at the desired physical target location. For example, the orientation that the light fixture is expected to have may be determined through a lighting design process. Adjustments in the orientation of the installed light fixture may be performed if the difference in the orientation of the AR device 122 and the desired orientation exceeds a threshold as can be readily understood by those of ordinary skill in the art with the benefit of the scope of this disclosure.

In some example embodiments, the real-time image of the area 102 may be an image as seen by the camera unit 306 and may be displayed on the display unit 200 or on another display unit after a lag time (e.g., transmission and processing time) following the image being seen/captured by the camera unit 306. In some example embodiments, the AR device 122 may be an AR system, where the some of the components are at different locations from each other. For example, in some example embodiments, the camera unit 306 may be separate from the AR unit 502 and may communicate with the AR unit 502 wirelessly or via a wired connection. To illustrate, in embodiments where the AR device 122 is described as being attached to a light fixture, the camera unit 306 may instead be attached to the light fixture. In some alternative embodiments, the display unit 200 may be separate from the camera unit 306 and/or the AR unit 502 without departing from the scope of this disclosure. In some alternative embodiments, the images described as being displayed on the display unit 200 may be displayed on another display unit (e.g., a remote display unit) instead of or in addition to the display unit 200. In some alternative embodiments, the AR device 122 may include more or fewer components than shown without departing from the scope of this disclosure. In some alternative embodiments, the components of the AR device 122 may be connected in a different configuration than shown without departing from the scope of this disclosure.

Figure 6:
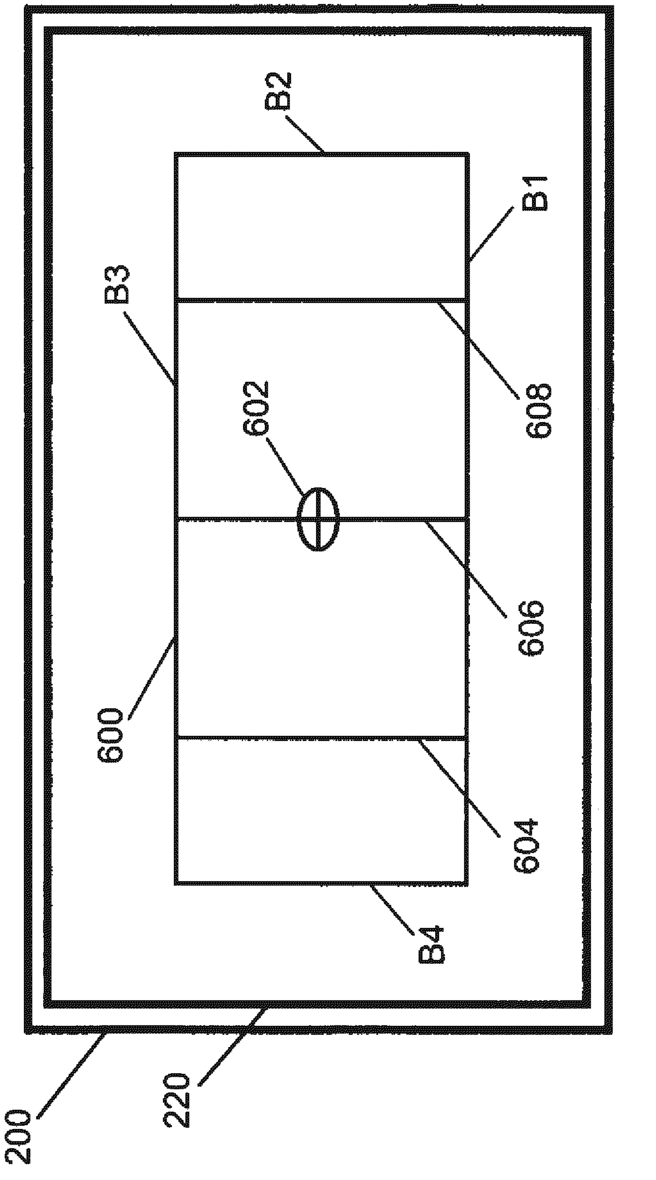
FIG. 6 illustrates a real-time image of the area displayed on the display unit according to an example embodiment.

FIGS. 6-12 illustrate images displayed during an AR based light fixture aiming process according to example embodiments. To illustrate, FIG. 6 illustrates a real-time image 600 of the area 102 (shown in FIG. 1) displayed on a display screen 220 of the display unit 200 according to an example embodiment. Referring to FIGS. 1-6, in some example embodiments, the real-time image 600 may be an image of the area 102 as viewed by the camera unit 306 of the AR device 122 attached to the light fixture 104 shown in FIG. 1. The real-time image 600 may include inside boundary perimeters B1, B2, B3, B4 that correspond to the boundary perimeters P1, P2, P3, P4 of the area 102 shown in FIG. 1. The real-time image 600 may also include inside lines 604-608 that correspond to the lines F1, F2, F3 of the area 102 shown in FIG. 1. In some alternative embodiments, the real-time image 600 may be an image of the area 102 as viewed by the camera unit 306 of the AR device 122 attached to another one of the light fixtures 106-118.

In some example embodiments, a reticle 602 of the camera unit 306 may be displayed on the screen 220 of the display unit 200. For example, the reticle 602 may be physically present on a lens of the camera unit 306 or may be digitally generated as can be readily understood by those of ordinary skill in the art. The reticle 602 may be displayed at the center of the screen 220 and may correspond to the center of the lens of the camera unit 306. The reticle 602 may also be made visible regardless of whether other image(s) are displayed on the screen 220. In some alternative embodiments, another visual reference of the camera unit 306 may be used instead of the reticle 602 without departing from the scope of this disclosure.

As shown in FIG. 6, the reticle 602 may be displayed along with the real-time image 600. When the position of the real-time image 600 on the display screen 220 changes because of a change in the position of the camera unit 306/the AR device 122, the relative position of the reticle 602 with the respect to the real-time image 600 may also change.

In some alternative embodiments, the reticle 602 may have a different shape and size than shown in FIG. 6 without departing from the scope of this disclosure. In some alternative embodiments, the reticle 602 may be displayed a different location on the screen 220 than shown in FIG. 6 without departing from the scope of this disclosure.

Figure 7:
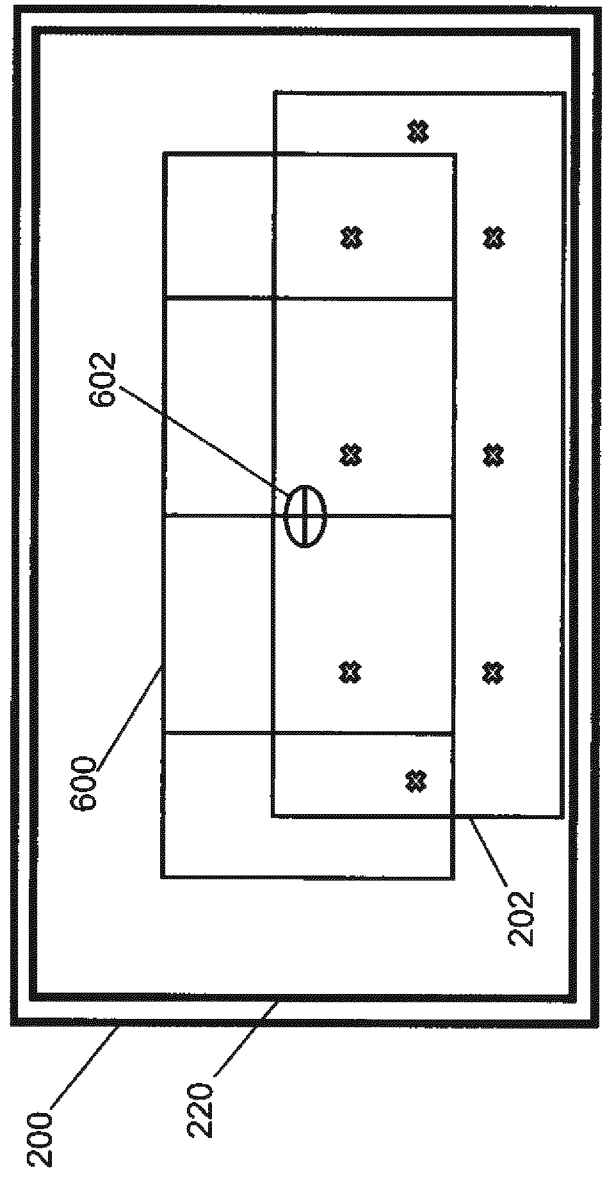
FIG. 7 illustrates the real-time image of the area and the rendered image of the area displayed on the display unit according to an example embodiment.

FIG. 7 illustrates the real-time image 600 of the area 102 and the rendered image 202 of the area 102 (shown in FIG. 2) displayed on the display unit 200 according to an example embodiment. Referring to FIGS. 1-7, in some example embodiments, the rendered image 202 is displayed on the screen 220 partially overlapped with the real-time image 600 as shown in FIG. 7. For example, the AR unit 502 may obtain the rendered image 202 from the memory device 506 or from another source. The rendered image 202, as shown in FIG. 7, is taken at a time prior to the light fixture 104 being aimed at a desired physical target location (e.g., the location T1 shown in FIG. 1) based on the rendered image 202 and the real-time image 600. As shown in FIG. 7, the reticle 602 may remain displayed on the screen 220. The real-time image 600, as shown in FIG. 7, may be in the same or different position on the screen 220 from that shown in FIG. 6.

Figure 8:
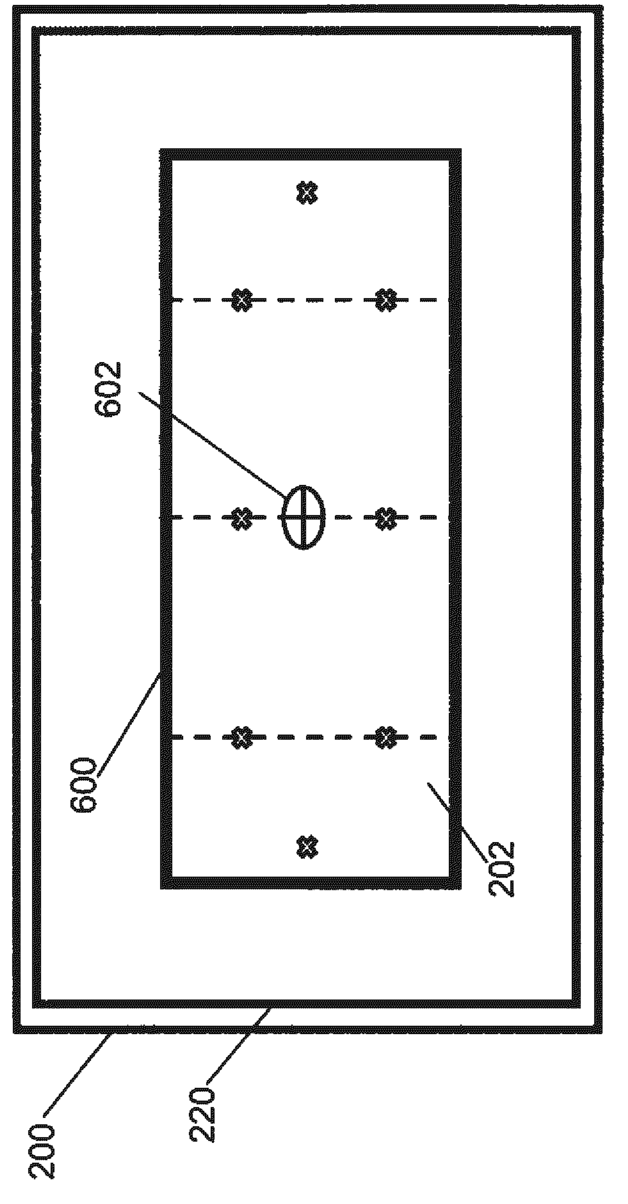
FIG. 8 illustrates the rendered image overlayed on the real-time image of the area according to an example embodiment.

FIG. 8 illustrates the rendered image 202 overlayed on the real-time image 600 of the area 102 displayed on the screen 220 of the display unit 200 according to an example embodiment. Referring to FIGS. 1-8, in some example embodiments, the AR device 122 may display on the screen 220 of the display unit 200 the rendered image 202 overlayed on the real-time image 600. To illustrate, the AR unit 502 (shown in FIG. 5) of the AR device 122 may execute software code (e.g., an image processing software code) to identify one or more matching features (e.g., boundary perimeters, inside lines, etc.) between the real-time image 600 and the rendered image 202 and overlay the rendered image 202 on the real-time image 600 such that the two images are, for example, fully overlapped. Alternatively or in addition, the AR unit 502 may receive user input (e.g., using a mouse or a finger) that manually moves the rendered image 202 displayed on the screen 220 such that the rendered image 202 is overlayed on the real-time image 600 as shown in FIG. 8. The rendered image 202 may be visible on the screen 220 over other objects that may, for example, partially obstruct the view of the camera unit 306.

In some example embodiments, after the rendered image 202 is overlayed on the real-time image 600 as shown in FIG. 8, the rendered image 202 may be anchored to the real-time image 600. To illustrate, the rendered image 202 may remain overlayed on the real-time image 600 regardless of a change of position of the real-time image 600 on the screen 220, for example, because a change in the view of the camera unit 306.

In some example embodiments, after the rendered image 202 is overlayed on the real-time image 600 as shown in FIG. 8, the real-time image 600 may be fully or mostly hidden from view on the screen 220. For example, the inside lines 604, 606, 608 of the real-time image 600 (shown in FIG. 6) are shown as dotted lines in FIG. 8 for illustrative purposes and may not be visible after the rendered image 202 is overlayed on the real-time image 600. In FIG. 8, the perimeters of the rendered image 202 are thicker than shown in FIG. 2 to illustrate that the rendered image 202 is overlayed on the real-time image 600 and may have the same thickness as shown on FIG. 2. As shown in FIG. 8, the reticle 602 may remain displayed on the screen 220.

Figure 9:
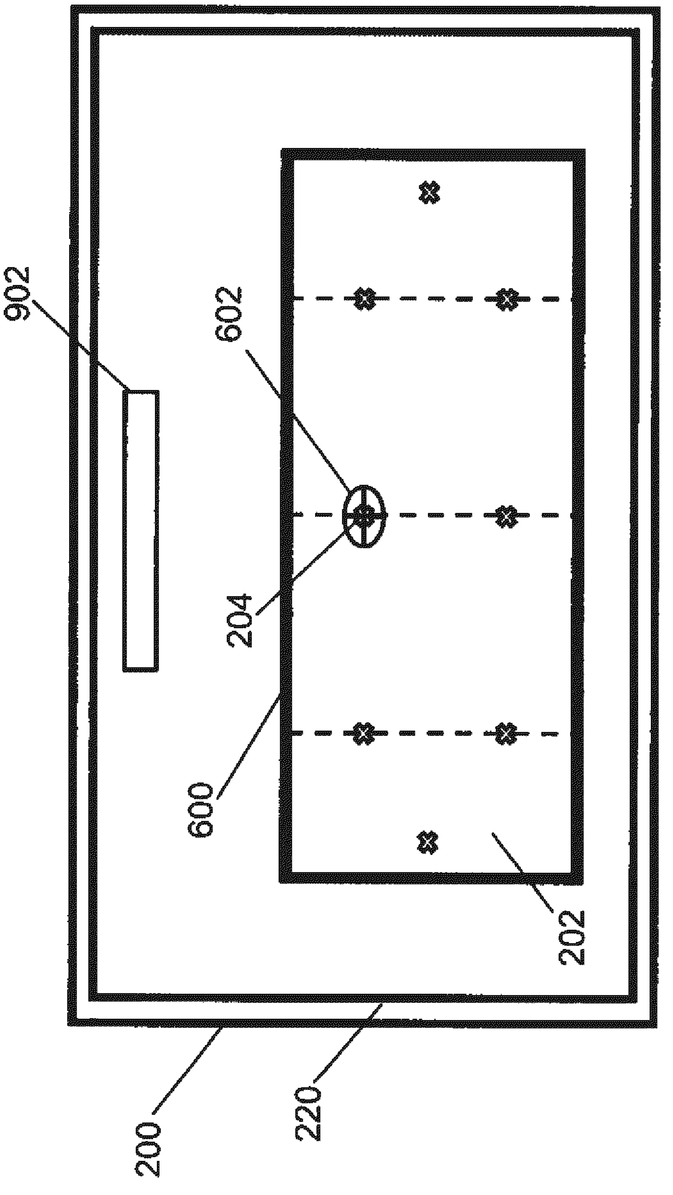
FIG. 9 illustrates the reticle of the camera unit overlapped with the virtual marker of the rendered image according to an example embodiment.

FIG. 9 illustrates the reticle 602 of the camera unit 306 of FIG. 5 overlapped with the virtual marker 204 of the rendered image 202 displayed on the screen 220 of the display unit 200 according to an example embodiment. Referring to FIGS. 1-9, in some example embodiments, the virtual marker 204 in the rendered image 202 may correspond to the physical target location T1 (shown in FIG. 1) of the area 102, which may be the desired physical target location for aiming the light fixture 104. To aim the light fixture 104 at the physical target location T1, after the rendered image 202 is overlayed on the real-time image 600 as shown in FIG. 8, the light fixture 104 along with the AR device 122 may be moved, for example, by a person such that the reticle 602 and the virtual marker 204 overlap each other on the screen 220 as shown in FIG. 9. That is, adjusting the position of the light fixture 104 along with the attached AR device 122 (or the camera unit 306) such that the reticle 602 and the virtual marker 204 of the rendered image 202 overlap on the screen 220 may result in the light fixture 104 being aimed at the physical target location T1.

As shown in FIG. 9, after the reticle 602 and the virtual marker 204 overlap each other, the positions of the rendered image 202 and the real-time image 600 on the screen 220 are different from the respective positions shown in FIG. 8. To illustrate, the rendered image 202 and the real-time image 600 may be lower on the screen 220, and other objects (e.g., a structure 902) near the area 102 that come into the view of the camera unit 306 may be displayed on the screen 220.

In some example embodiments, after the light fixture 104 is aimed at the physical target location T1 as described above, the orientation (e.g., tilt and pan positions) of camera unit 306/the AR device 122 may be determined by the AR device 122 in a similar manner as described with respect to FIG. 5. Because the orientation of the AR device 122 is expected to be the same as or to closely match the orientation of the light fixture 104 to which the AR device 122 is attached, the orientation of the AR device 122 after the aiming of the light fixture 104 at the physical target location T1 may be compared against the orientation that the light fixture 204 is expected to have when the light fixture 104 is aimed at the physical target location T1. For example, because the camera unit 306 may not be at the exact same location of the light fixture 104 used in a lighting design process, the orientation of the AR device 122 may be slightly different from the desired orientation of the light fixture 104. Additional small adjustments in the orientation of the light fixture 104 may be performed if the difference in the orientation of the AR device 122 and the desired orientation of the light fixture 104 exceeds a threshold as can be readily understood by those of ordinary skill in the art.

In some alternative embodiments, the light fixture 104 along with the attached AR device 122 may be moved such that the reticle 602 overlaps with another one of the virtual markers. In some alternative embodiments, the rendered image 202 and the real-time image 600 may be at a different position on the screen 220 than shown in FIG. 9 without departing from the scope of this disclosure. In some alternative embodiments, the rendered image 202 may include inside lines that correspond to the lines F1, F2, F3 of the area 102 without departing from the scope of this disclosure.

Figure 10:
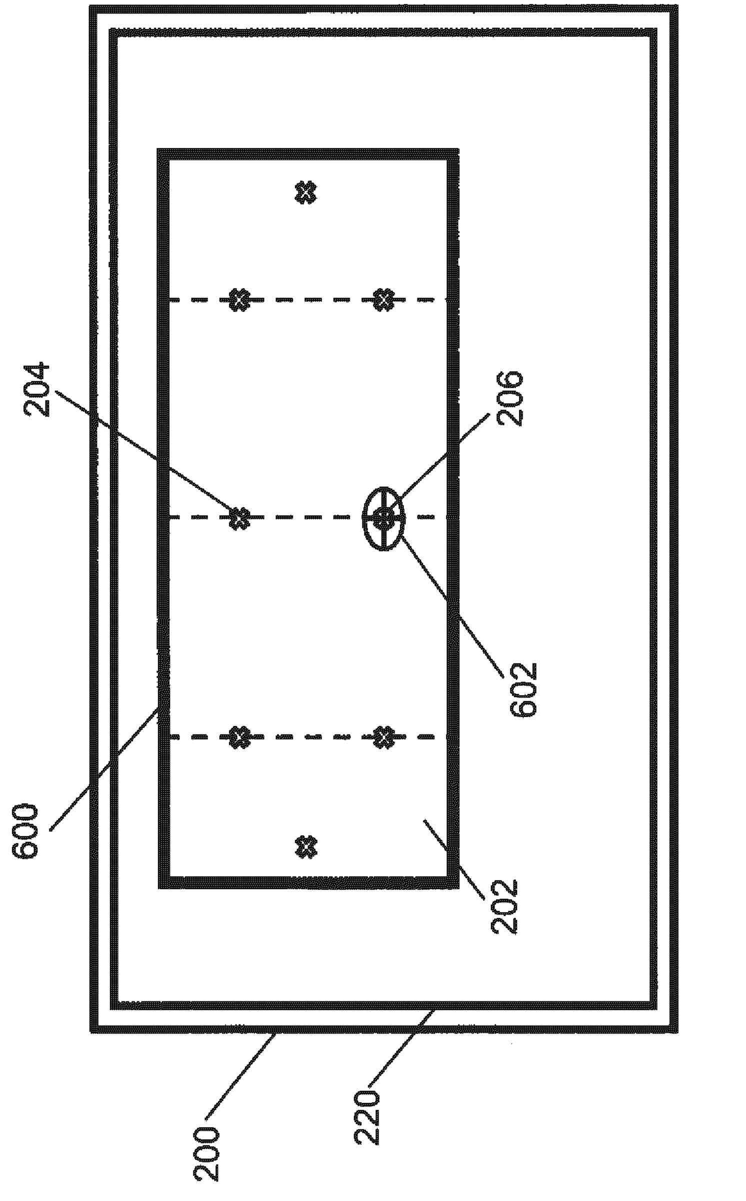
FIG. 10 illustrates the reticle of the camera unit overlapped with the virtual marker of the rendered image according to an example embodiment.

FIG. 10 illustrates the reticle 602 of the camera unit 306 of FIG. 5 overlapped with the virtual marker 206 of the rendered image 202 displayed on the screen 220 of the display unit 200 according to an example embodiment. Referring to FIGS. 1-10, in some example embodiments, the light fixture 104 may need to be aimed at the physical target location T3 of the area 102 shown in FIG. 1 instead of at the physical target location T1. For example, the virtual marker 206 may correspond to the physical target location T3. To illustrate, the AR device 122 may be attached to and may move along with the light fixture 104 such that the reticle 602 is overlapped with the virtual marker 206 on the screen 220 as shown in FIG. 10. In some example embodiments, the light fixture 104 may be aimed at the physical target location T1 for some events in the space 100 and may be aimed at the physical target location T3 for other events.

In some alternative embodiments, the AR device 122 may be attached to the light fixture 106 instead of the light fixture 104. To illustrate, the real-time image 600 displayed on the screen 220 when the AR device 122 is attached to the light fixture 106 may appear different from the real-time image 600 that results from the AR device 122 being attached to the light fixture 104 or to the other light fixtures because of the different view of the camera unit 306. The rendered image 202 of FIG. 2 may then be overlayed on and anchored to the real-time image 600 in the manner described with respect to FIGS. 6-8. To aim the light fixture 106 at the physical target location T3 in the area 102, the light fixture 106 along with the AR device 122 may be moved such that the reticle 602 is overlapped with the virtual marker 206 on the screen 220 as shown in FIG. 10.

Figure 11:
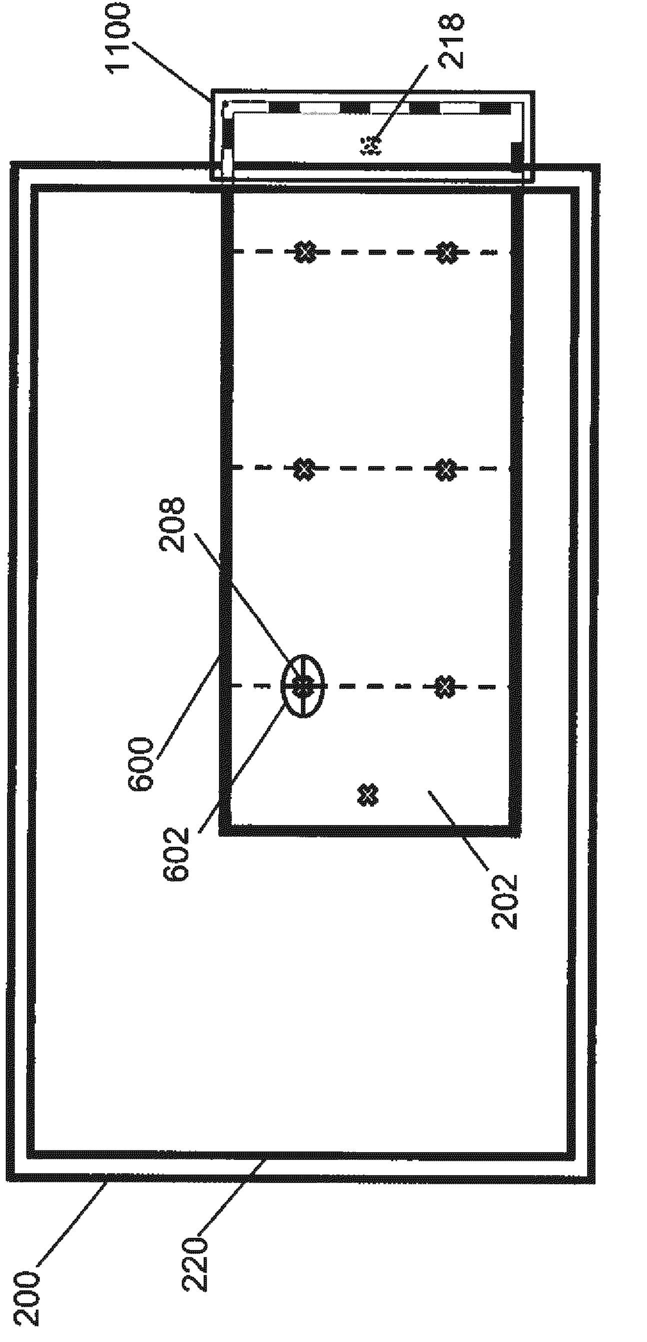
FIG. 11 illustrates the reticle of the camera unit overlapped with the virtual marker of the rendered image according to an example embodiment.

FIG. 11 illustrates the reticle 602 of the camera unit 306 of FIG. 5 overlapped with the virtual marker 208 of the rendered image 202 displayed on the screen 220 of the display unit 200 according to an example embodiment. Referring to FIGS. 1-11, in some example embodiments, the AR device 122 may be attached to the light fixture 108 of FIG. 1 such that the AR device 122 and the light fixture 108 move (e.g., change in tilt and/or pan positions) together. After the AR device 122 is attached to the light fixture 108, the real-time image 600 of the area 102 may be displayed on the screen 220 based on the view of the camera unit 306. To illustrate, the real-time image 600 displayed on the screen 220 when the AR device 122 is attached to the light fixture 108 may appear different from the real-time image 600 that results from the AR device 122 being attached to the light fixture 104 or to the other light fixtures because of the different view of the camera unit 306. The rendered image 202 of FIG. 2 may then be overlayed on and anchored to the real-time image 600 in the manner described with respect to FIGS. 6-8. To aim the light fixture 108 at the desired physical target location (e.g., the physical target location T2) in the area 102 that corresponds to a virtual location in the rendered image 202 indicated by the virtual marker 208, the light fixture 108 and the AR device 122 are moved along with each other such that the reticle 602 is overlapped with the virtual marker 208 on the screen 220 as shown in FIG. 11.

In some example embodiments, respective portions of the rendered image 202 and the real-time image 600 shown in FIG. 11 inside a dotted box 1100 may be off the screen 220 because of the amount of movement of the light fixture 108 and the attached AR device 122 required for the reticle 602 to overlap with the virtual marker 208.

Figure 12:
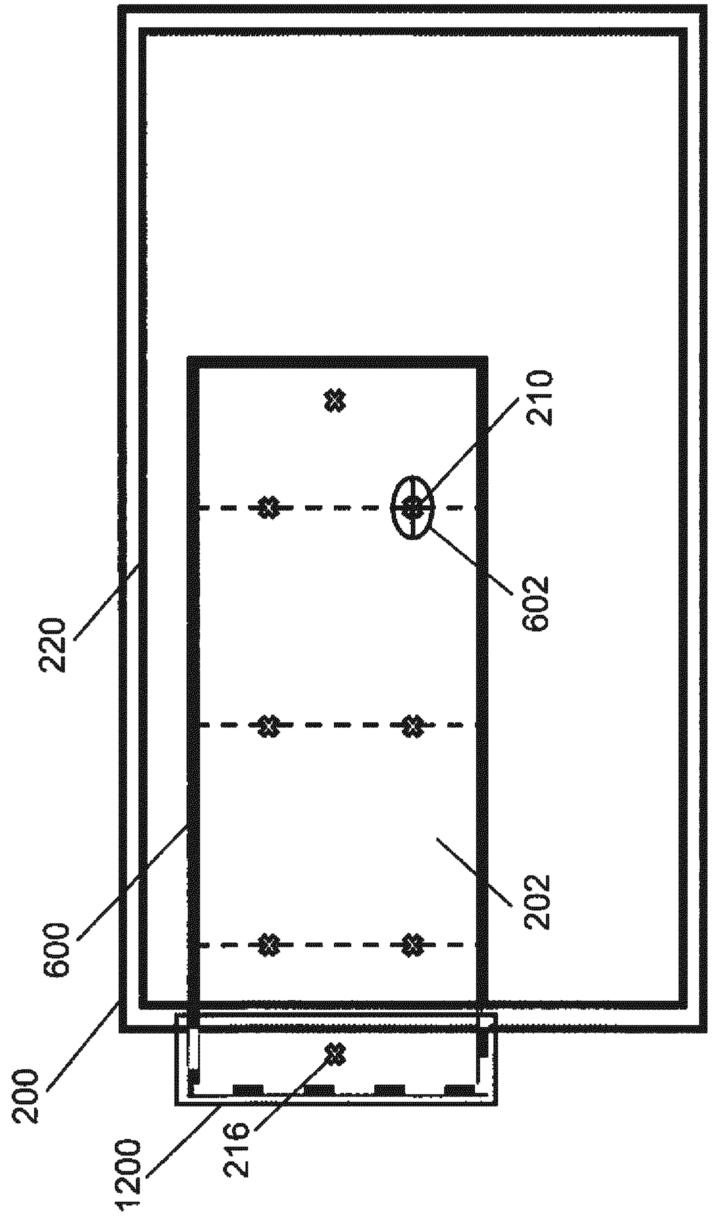
FIG. 12 illustrates the reticle of the camera unit overlapped with the virtual marker of the rendered image according to an example embodiment.

FIG. 12 illustrates the reticle 602 of the camera unit 306 of FIG. 5 overlapped with the virtual marker 210 of the rendered image 202 displayed on the screen 220 of the display unit 200 according to an example embodiment. Referring to FIGS. 1-12, in some example embodiments, the AR device 122 may be attached to the light fixture 110 of FIG. 1 such that the AR device 122 and the light fixture 110 move (e.g., change in tilt and/or pan positions) together. After the AR device 122 is attached to the light fixture 110, the real-time image 600 of the area 102 may be displayed on the screen 220 based on the view of the camera unit 306. To illustrate, the real-time image 600 displayed on the screen 220 when the AR device 122 is attached to the light fixture 110 may appear different from the real-time image 600 that results from the AR device 122 being attached to the light fixture 104 or to the other light fixtures because of the different view of the camera unit 306. The rendered image 202 of FIG. 2 may then be overlayed on and anchored to the real-time image 600 in the manner described with respect to FIGS. 6-8. To aim the light fixture 110 at the desired physical target location in the area 102 that corresponds to a virtual location in the rendered image 202 indicated by the virtual marker 210, the light fixture 110 and the AR device 122 are moved along with each other such that the reticle 602 is overlapped with the virtual marker 210 on the screen 220 as shown in FIG. 12.

In some example embodiments, respective portions of the rendered image 202 and the real-time image 600 shown in FIG. 11 inside a dotted box 1200 may be off the screen 220 because of the amount of movement of the light fixture 110 and the AR device 122 required for the reticle 602 to overlap with the virtual marker 208.

In some example embodiments, the other light fixtures in the space 100 of FIG. 1 may be aimed at respective physical target locations in the area 102 using the AR device 122 in a similar manner as described with respect to the light fixtures 104-110. Additional adjustments of the positions of the light fixtures 104-118 may be performed by comparing the desired orientations of the light fixtures derived from a lighting design process and the orientation of the AR device 122 (and thus, of the camera unit 306) after the aiming is performed using the AR device 122 as described above, for example, with respect to light fixture 104 and FIG. 9.

Figure 13:
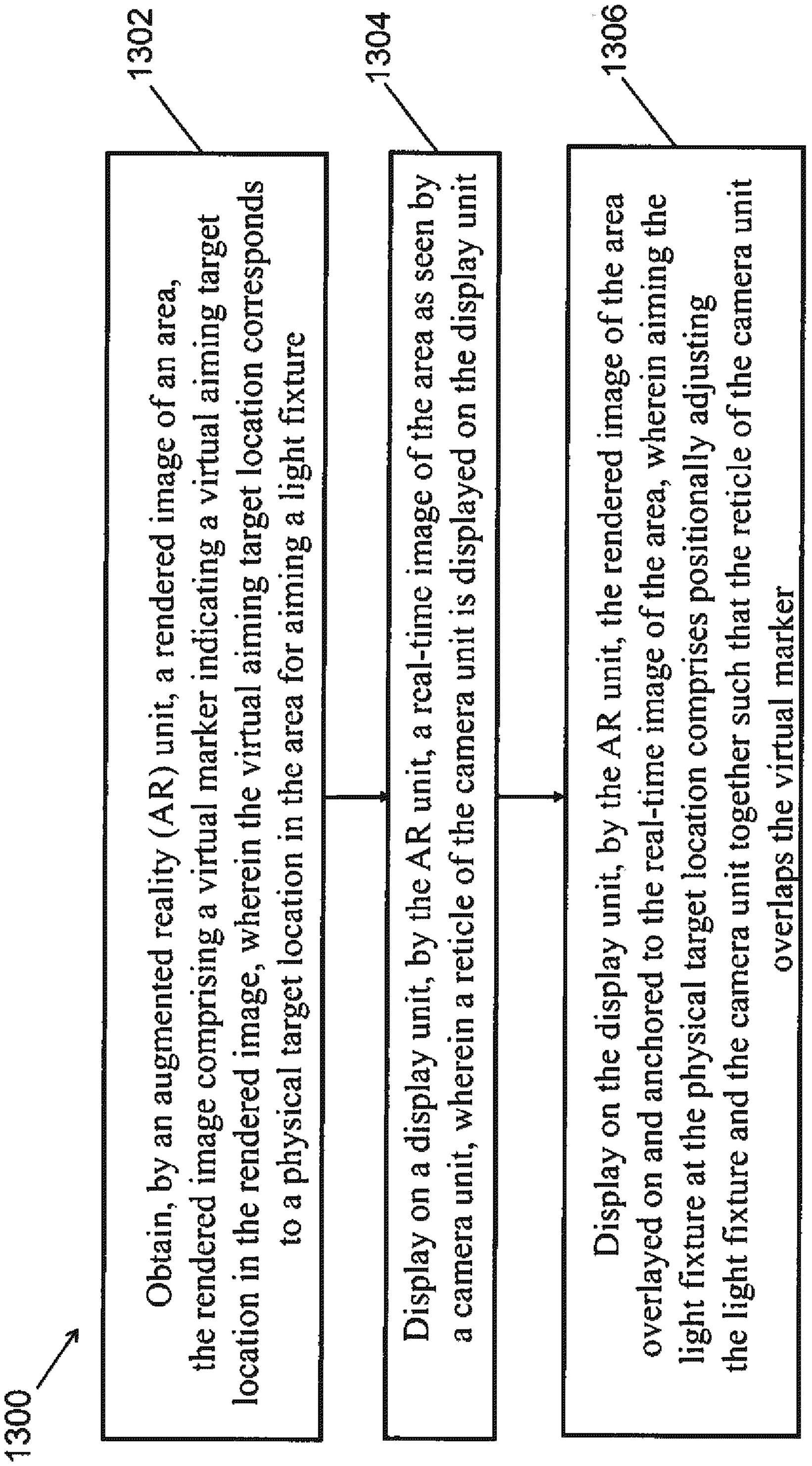
FIG. 13 illustrates an AR based method of aiming a light fixture according to an example embodiment.

FIG. 13 illustrates an AR based method 1300 of aiming a light fixture (e.g., the light fixtures 104-118) according to an example embodiment. Referring to FIGS. 1-13, in some example embodiments, the method 1300 includes, at step 1302, obtaining, by the AR unit 502, the rendered image 202 of the area 102. The rendered image may include a virtual marker (e.g., the virtual markers 204-218) indicating a virtual aiming target location in the rendered image 202, where the virtual aiming target location corresponds to a physical aiming target location (e.g., the locations T1, T2, T3) in the area 102 for aiming a light fixture (e.g., the light fixtures 104-118).

In some example embodiments, the method 1300 may include, at step 1304, displaying on the display unit 200, by the AR unit 502, the real-time image 600 of the area 102 as seen by a camera unit 306. The reticle 602 of the camera unit 306 may be displayed on the display unit 200. At step 1306, the method 1300 may include displaying on the display unit 200, by the AR unit 502, the rendered image 202 of the area 120 overlayed on and anchored to the real-time image 600 of the area 102. The aiming the light fixture (e.g., the light fixtures 104-118) at the physical target location includes positionally adjusting the light fixture and the camera unit 306 together such that the reticle 602 of the camera unit 306 overlaps the virtual marker (e.g., the virtual markers 204-218).

In some example embodiments, the method 1300 may include generating the rendered image 202 at least based on dimensional parameters of the area 102 and physical target locations (e.g., locations T1, T2, T3) in the area 102. For example, the AR device 122 or another computing device may be used to generate the rendered image 202. The method 1300 may also include determining, by the AR device, an orientation of the AR device 122 and comparing the orientation of the AR device 122 with a desired orientation of the light fixture (e.g., the light fixtures 104-118) that is expected to result in the light fixture being aimed at a desired physical target location (e.g., the locations T1, T2, T3). As described above, a desired physical target location for each light fixture may be determined through a lighting design process.

In some alternative embodiments, the method 1300 may include other steps without departing from the scope of this disclosure. In some alternative embodiments, some steps of the method 1300 may be performed in a different order than described without departing from the scope of this disclosure. In some alternative embodiments, one or more steps of the method 1300 may be omitted without departing from the scope of this disclosure.

FIGS. 14-17 illustrate images displayed during an AR based light fixture aiming process according to other example embodiments. In contrast to the AR based light fixture aiming method described with respect to FIGS. 6-13, the alternative method described below with respect to FIGS. 14-17 relies on the rendered image 1400 of FIG. 14 that is generated with respect to each light fixture 104-118 of FIG. 1. Referring to FIGS. 1-5 and 14, the rendered image 1400 may be generated for each light fixture 104-118 based on the expected view of the area 102 that the camera unit 306 may have from the installation location of the particular light fixture and at an orientation of the camera unit 306 that results in the particular light fixture being aimed at the respective physical target location in the area 102. For example, the rendered image 1400 may be generated for the light fixture 104 based on the expected view of the area 102 that the camera unit 306 may have from the installation location of the light fixture 104 and at an orientation of the camera unit 306 that results in the light fixture 104 being aimed at the physical target location T1 shown in FIG. 1.

In some example embodiments, during a process of aiming the light fixture 104, the AR device 122 may display the rendered image 1400 anchored to a particular location of the display screen 220 of the display unit 200. For example, the AR device 122 may display the rendered image 1400 anchored to the screen 220 automatically upon obtaining the rendered image 1400 or in response to user input provided to the AR device 122. After the rendered image 1400 is anchored to the display screen 220, the position of the rendered image 1400 on the display screen 220 may remain unchanged during the process of aiming the light fixture 104 at the physical target location T1.

Figure 15:
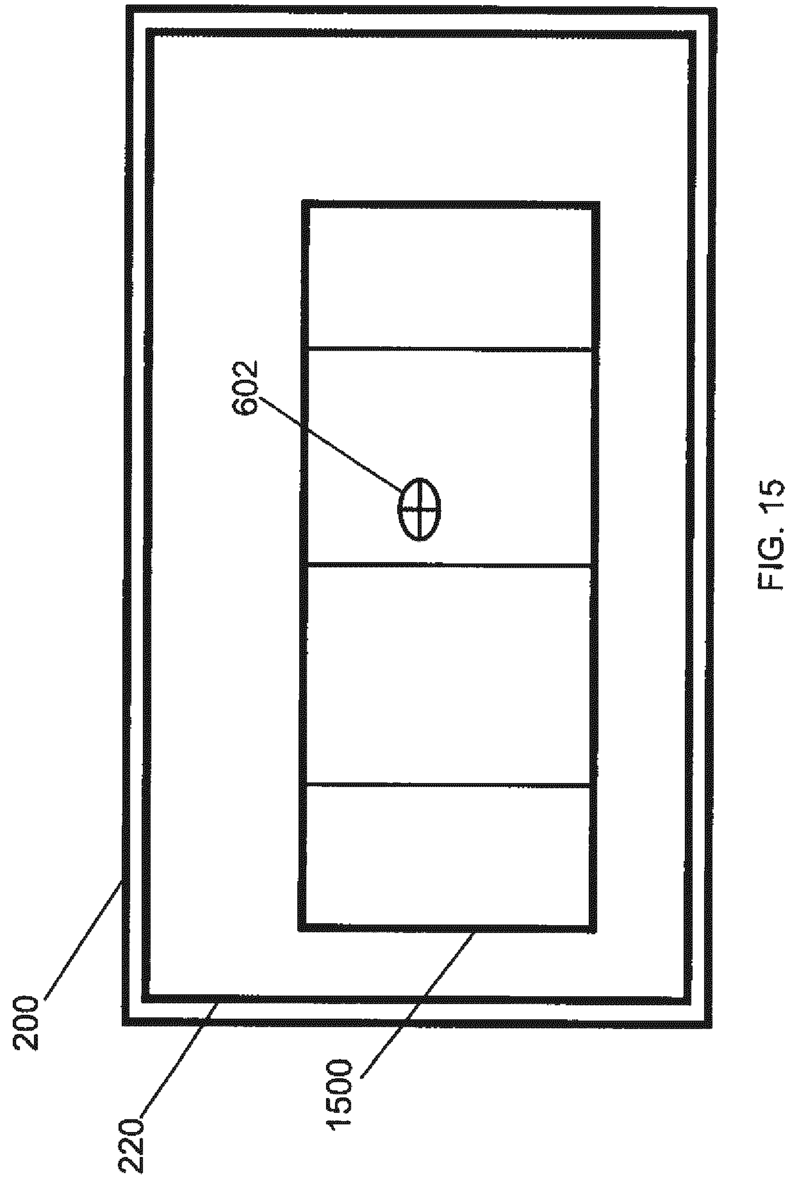
FIG. 15 illustrates a real-time image of the area displayed on the display unit 200 according to an example embodiment.

FIG. 15 illustrates a real-time image 1500 of the area 102 displayed on the screen 220 of the display unit 200 according to an example embodiment. Referring to FIGS. 1-5, 14, and 15, the real-time image 1500 of FIG. 15 may be based on the view of the camera unit 306 of the AR device 122 while the AR device 122 is attached to the light fixture 104. Although the reticle 602 is shown in FIG. 15, the AR based method described with respect to FIGS. 14-18 does not rely on the reticle 602 for aiming of the light fixture 104 at the physical target location T1.

In some alternative embodiments, the real-time image 1500 may be displayed at a different location on the screen 220 than shown in FIG. 15 without departing from the scope of this disclosure. As shown in FIG. 15, the real-time image 1500 may be displayed on the screen 220 of the display unit 200 without the rendered image 1400 of FIG. 14.

Figure 16:
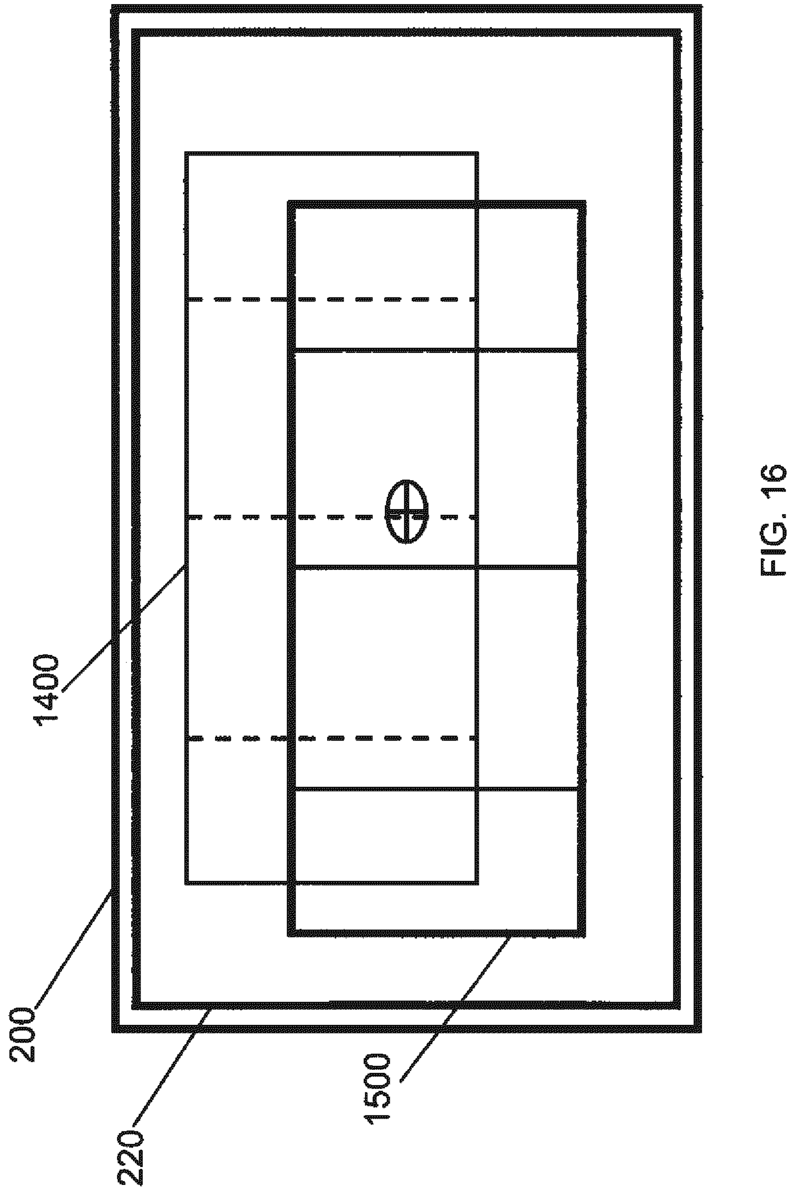
FIG. 16 illustrates the rendered image and the real-time image of the area displayed on the display unit according to an example embodiment.

FIG. 16 illustrates the rendered image 1400 and the real-time image 1500 of the area 102 displayed on the display unit 200 according to an example embodiment. Referring to FIGS. 1-5 and 14-16, after the AR device 122 is attached to the light fixture 104, the rendered image 1400 may be displayed on the screen 220 anchored to a particular location of the display screen 220 regardless of a change in the orientation of the light fixture 104 or the AR device 122. The real-time image 1500 may be at the same location of the screen 220 as shown in FIG. 15 or may be at a different location depending on the position of the light fixture 104 and the AR device 122. To illustrate, the light fixture 104 along with the AR device 122 may be moved (e.g., tilt and/or pan positions changed), for example, by a person such that the position of the real-time image 1500 displayed on the screen 220 changes while the rendered image 1400 stays anchored at the same location of the screen 220.

Figure 17:
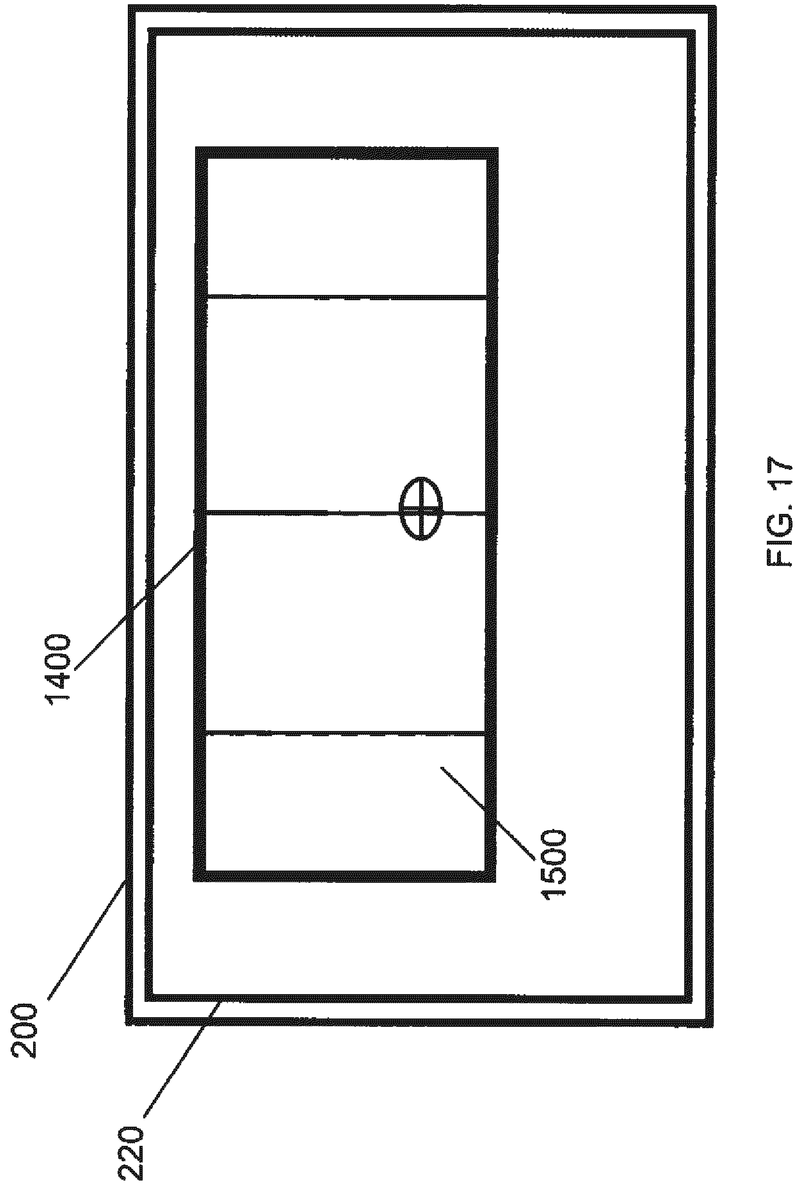
FIG. 17 illustrates the rendered image and the real-time image of the area displayed on the display unit overlapping each other according to an example embodiment.

FIG. 17 illustrates the rendered image 1400 and the real-time image 1500 of the area 102 displayed on the display unit 200 overlapping each other according to an example embodiment. Referring to FIGS. 1-5 and 14-17, after the rendered image 1400 and the real-time image 1500 are displayed on the screen 220, the light fixture 104 along with the AR device 122 may be moved (e.g., tilt and/or pan positions changed) such that the real-time image 1500 and the anchored rendered image 1400 fully overlap each other as shown in FIG. 17. For example, the real-time image 1500 may be overlayed on the rendered image 1400 or vice versa. Because the rendered image 1400 is generated based on the view that the camera unit 306 is expected to have from the location of the light fixture 104 and when aimed at the physical target location T1, adjusting the position of the light fixture along with AR device 122 such that the rendered image 1400 and the real-time image 1500 are overlapped as shown in FIG. 17 may result in the light fixture 104 being aimed at the desired physical target location T1.

Although the AR based method with respect to FIGS. 14-17 is described mainly with reference to the light fixture 104 and the physical target location T1, the method may be used to aim the other light fixtures 106-118 in a similar manner. The method may be used to aim the light fixture 104 at a different physical target location, such as the location T2, in a similar manner.

Figure 18:
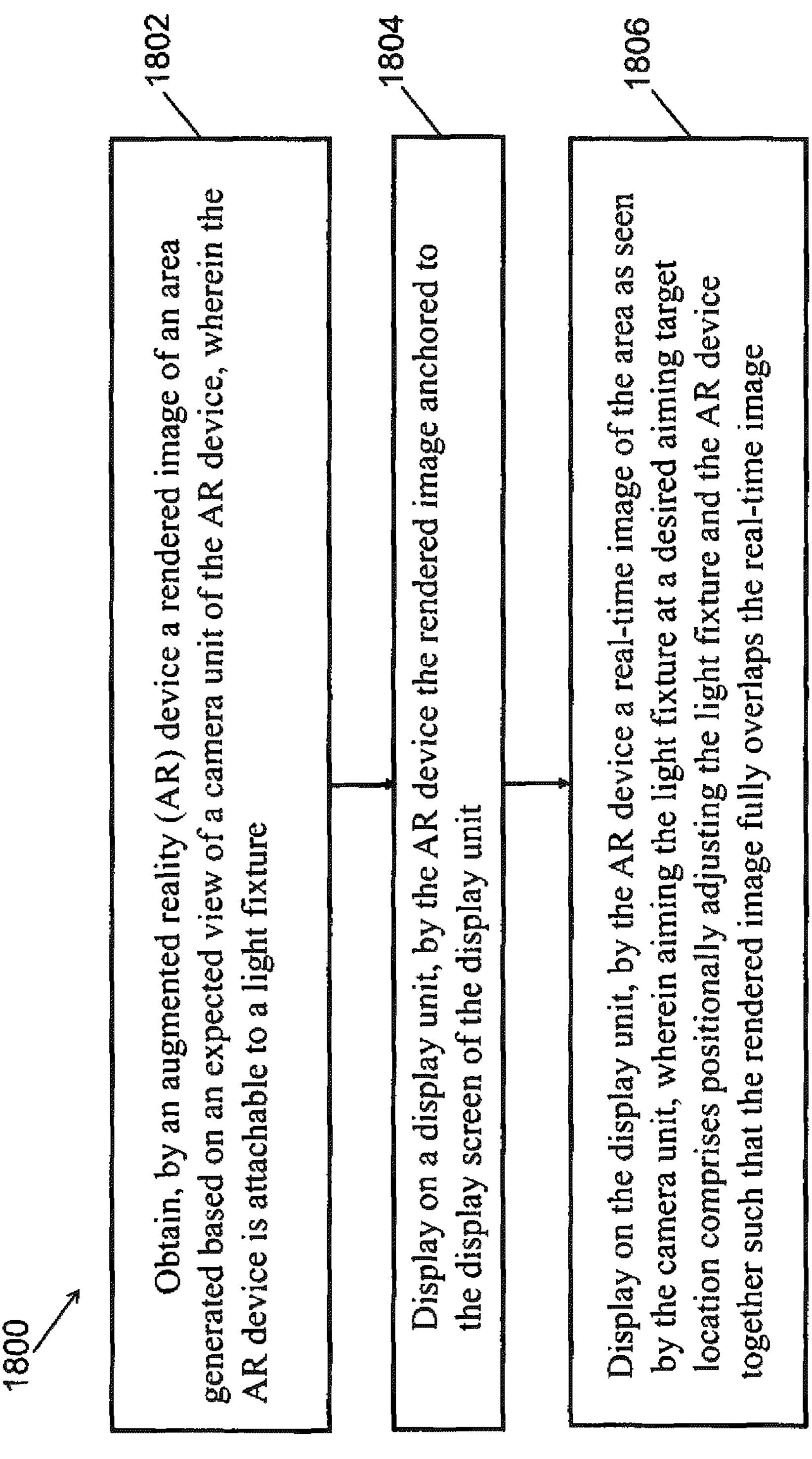
FIG. 18 illustrates an AR based method of aiming a light fixture according to another example embodiment.

FIG. 18 illustrates an AR based method 1800 of aiming a light fixture (e.g., the light fixtures 104-118) according to another example embodiment. Referring to FIGS. 1-5 and 14-18, in some example embodiments, the method 1800 may include, at step 1802, obtaining, by the AR device 122, the rendered image 1400 of the area 102 generated based on an expected view of the camera unit 306 of the AR device 122, where the AR device 122 is attachable to a light fixture. At step 1804, the method 1800 may include displaying on the display unit 200, by the AR device 122, the rendered image 1400 anchored to the display screen 220 of the display unit 200. At step 1806, the method 1800 may include displaying on the display unit 200, by the AR device 122, the real-time image 1500 of the area 102 as seen by the camera unit 306, where aiming the light fixture at a desired aiming target location (e.g., locations T1, T2, T3) includes positionally adjusting the light fixture 104 and the AR device 122 together such that the rendered image 1400 fully overlaps the real-time image 1500.

In some alternative embodiments, the method 1800 may include other steps without departing from the scope of this disclosure. In some alternative embodiments, some steps of the method 1800 may be performed in a different order than described without departing from the scope of this disclosure. In some alternative embodiments, one or more steps of the method 1800 may be omitted without departing from the scope of this disclosure.

Although particular embodiments have been described herein in detail, the descriptions are by way of example. The features of the embodiments described herein are representative and, in alternative embodiments, certain features, elements, and/or steps may be added or omitted. Additionally, modifications to aspects of the embodiments described herein may be made by those skilled in the art without departing from the scope of the following claims, the scope of which are to be accorded the broadest interpretation so as to encompass modifications and equivalent structures.

The invention claimed is:

1. An augmented reality (AR) device for aiming light fixtures, the AR device comprising:
 a camera unit;
 a display unit; and
 an AR unit configured to:
  obtain a rendered image of an area, the rendered image comprising a virtual marker indicating a virtual target location in the rendered image, wherein the virtual target location corresponds to a physical target location in the area for aiming a first light fixture, wherein the rendered image is generated based on dimensions of the area and/or features of the area;
  display on the display unit a real-time image of the area as seen by the camera unit, wherein a reticle of the camera unit is displayed over the real-time image; and
  display on the display unit the rendered image of the area overlayed on and anchored to the real-time image of the area;
 wherein at least the camera unit of the AR device is attachable to the first light fixture such that adjusting a position of the first light fixture changes a position of the camera unit; and
 wherein when at least the camera unit of the AR device is attached to the first light fixture, at least the camera unit is positionally adjustable together with the first light fixture such that a position of the reticle of the camera unit displayed on the display unit changes relative to the virtual marker of the rendered image displayed on the display unit to aim the first light fixture at the physical target location.

2. The AR device of claim 1, wherein the rendered image comprises a second virtual marker, wherein the AR device is portable, and wherein the AR device, when attached to a second light fixture, is positionally adjustable together with the second light fixture such that the reticle of the camera unit overlaps the second virtual marker to aim the second light fixture at a second physical target location corresponding to the second virtual marker.

3. The AR device of claim 1, wherein adjusting a position of the first light fixture results in changing a location of the real-time image on the display unit.

4. The AR device of claim 3, wherein the AR unit is further configured to determine an orientation of the AR device and to compare the orientation of the AR device with an orientation of the first light fixture that is expected to result in the first light fixture being aimed at the physical target location.

5. A method of light fixture aiming, the method comprising:
 obtaining, by an augmented reality (AR) device, a rendered image of an area, the rendered image comprising a virtual marker indicating a virtual target location in the rendered image, wherein the virtual target location corresponds to a physical target location in the area for aiming a first light fixture, wherein the rendered image is generated based on dimensions of the area and/or features of the area;
 displaying on a display unit of the AR device, a real-time image of the area captured by a camera unit of the AR device, wherein the real-time image is captured while at least the camera unit of the AR device is attached to the first light fixture, wherein at least the camera unit of the AR device is attached to the first light fixture such that adjusting a position of the first light fixture changes a position of the camera unit, and wherein a reticle of the camera unit is displayed on the display unit;
 displaying on the display unit of the AR device, the rendered image of the area overlayed on and anchored to the real-time image of the area;
 aiming the first light fixture at the physical target location by positionally adjusting the first light fixture and at least the camera unit of the AR device together such that the reticle of the camera unit displayed on the display unit overlaps the virtual marker of the rendered image displayed on the display unit.

6. The method of claim 5, wherein the rendered image comprises a second virtual marker indicating a second virtual target location in the rendered image and wherein aiming the first light fixture at a second physical target location instead of at the physical target location comprises moving the first light fixture along with the camera unit such that the reticle of the camera unit overlaps the second virtual marker.

7. The method of claim 5, wherein the rendered image comprises a second virtual marker indicating a second virtual target location in the rendered image and wherein the second virtual target location corresponds to a second physical target location in the area for aiming a second light fixture.

8. The method of claim 7, wherein aiming the second light fixture at the second physical target location comprises adjusting the second light fixture along with the camera unit such that the reticle of the camera unit overlaps the second virtual marker.

9. The method of claim 8, wherein a portion of the rendered image and a corresponding portion of the real-time image are off the display unit when the reticle of the camera unit overlaps the second virtual marker.

10. The method of claim 5, further comprising generating, by a processing device, the rendered image at least based on dimensional parameters of the area and the physical target location in the area.

11. The method of claim 5, wherein the AR device is configured to identify corresponding features of the rendered image and the real-time image and to overlay the rendered image on the real-time image based on the identified corresponding features.

12. The method of claim 5, wherein the rendered image is overlayed on the real-time image in response to a user input to the AR device to move the rendered image displayed on the display unit such that one or more features of the rendered image overlap corresponding one or more features of the real-time image.

13. The method of claim 5, wherein adjusting a position of the first light fixture results in a change in a location of the real-time image on the display unit.

14. The method of claim 13, further comprising determining, by the AR device, an orientation of the AR device and comparing the orientation of the AR device with an orientation of the first light fixture that is expected to result in the first light fixture being aimed at the physical target location.

* * * * *